Sept. 29, 1936.  R. S. SANFORD  2,055,505
CLUTCH CONTROL MECHANISM
Filed Oct. 5, 1931  2 Sheets-Sheet 1

INVENTOR.
Roy S. Sanford
BY H. V. Clayton
ATTORNEY

Sept. 29, 1936.  R. S. SANFORD  2,055,505
CLUTCH CONTROL MECHANISM
Filed Oct. 5, 1931  2 Sheets-Sheet 2
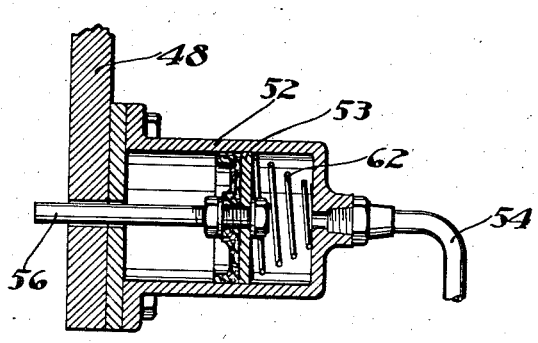
FIG. 7
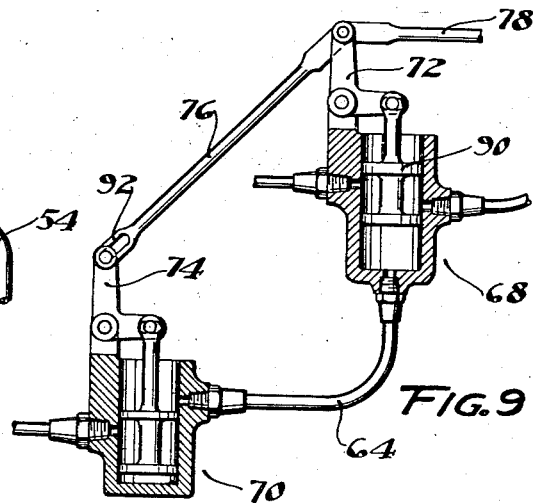
FIG. 9
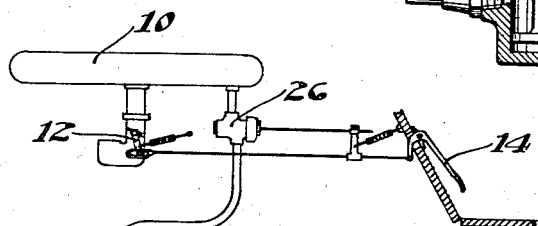
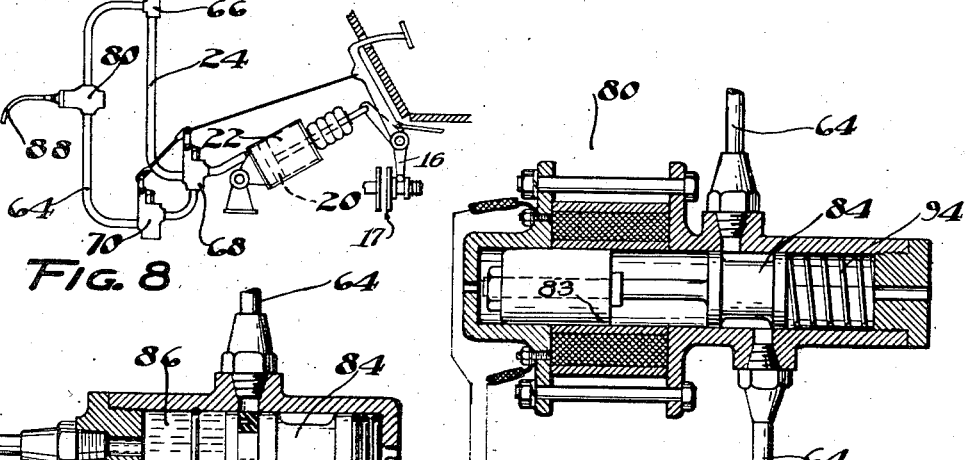
FIG. 8
FIG. 11
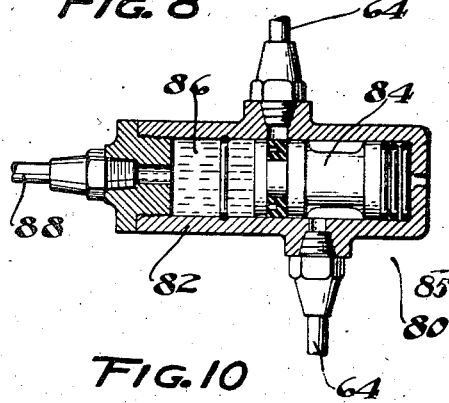
FIG. 10
INVENTOR.
ROY S. SANFORD
BY
ATTORNEY Patented Sept. 29, 1936

2,055,505

UNITED STATES PATENT OFFICE 2,055,505

CLUTCH CONTROL MECHANISM

Roy S. Sanford, South Bend, Ind., assignor to Bendix Aviation Corporation, South Bend, Ind., a corporation of Delaware Application October 5, 1931, Serial No. 566,884

15 Claims. (Cl. 192—.01)

This invention relates in general to control mechanism for automotive vehicles and particularly to the throttle, brakes and clutch, which mechanisms control the speed of the vehicle.

It is desirable that these controls be so related as to insure maximum efficiency in the operation of the vehicle and it is to this end that the invention is directed.

Succinctly stated, the invention comprehends a correlated throttle, brake and clutch mechanism whereby the clutch is automatically disengaged by power with the engine idling at closed throttle and automatically engaged as the throttle is opened, and whereby the clutch is automatically and momentarily reengaged as the brake is applied, being automatically disengaged by power at a predetermined drive shaft speed. The construction is further characterized by means, either manually operated or operated automatically and by power, for applying the clutch manually, through the medium of the brake pedal, in the event of the failure of certain power operated means normally operating the clutch.

A further feature of the invention resides in the provision of a power operated governor valve arranged to cooperate with two brake pedal operated valves, the three valves cooperating with an accelerator pedal operated valve and other parts of the power mechanism and with the brake pedal to provide the sequence of throttle, brake and clutch operations described above.

Other objects of the invention and desirable details of construction and combinations of parts will become apparent from a detailed description of certain embodiments of the invention, described in detail in the following specification taken in conjunction with the accompanying drawings illustrating said embodiments, in which:

Figure 7 is a longitudinal sectional view, taken on line 7—7 of Figure 6, through the power operated clutch and brake pedal interconnecting device of Figure 6;

Figure 8 is a diagrammatic view disclosing another embodiment of the invention whereby the clutch is momentarily engaged as the brake is applied;

Figure 9 is an enlarged and partial sectional view of the mechanism of Figure 8 disclosing certain of the valves of said mechanism;

Figure 10 is a longitudinal sectional view through the governor valve of Figure 8 and disclosing the valve member in its inoperative position; and Figure 11 is a longitudinal sectional view through a modified form of governor valve.

Figure 1:
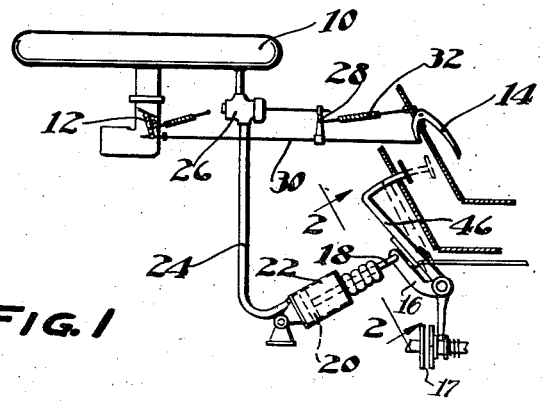
Figure 1 is a diagrammatic view of one embodiment of the throttle, clutch and brake control mechanism constituting the invention.
Figures 3, 4:
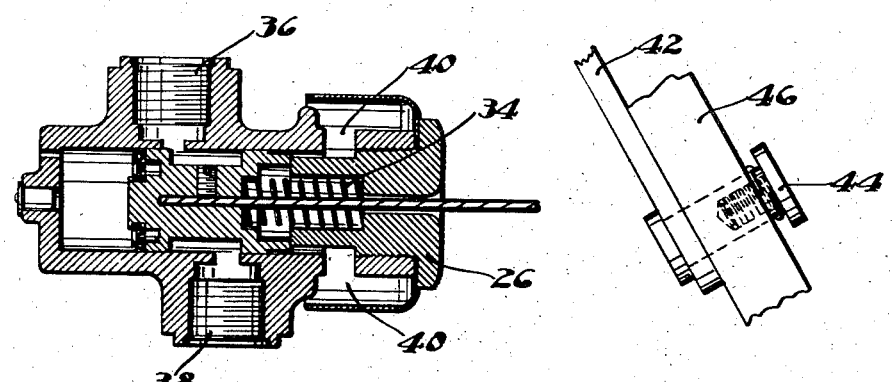
Figure 3 is an enlargement of the emergency connection between the clutch and brake pedals looking in the direction of the arrows 3—3 of Figure 2.
Figure 4 is a longitudinal sectional view of the power clutch control valve of Figure 1.

As illustrated diagrammatically in Figure 1, there is disclosed the conventional internal combustion engine intake manifold 10 and throttle 12, the latter operated by a spring returned accelerator pedal 14. The conventional clutch 17 is operated by a crank arm 16, the latter positively connected, by a rod 18, with the piston 20 of a cylinder 22, the latter parts constituting a vacuum operated fluid motor for power operation of the clutch. The motor is placed in circuit with the manifold 10 through the medium of conduit 24, a three-way control valve 26 for the motor being interposed in the vacuum connection. The valve is adapted to be opened by virtue of its connection 28 with the accelerator rod 30. With the accelerator released the spring 32 compresses valve spring 34, Figure 4, to intercommunicate the valve ports 36 and 38 to open the valve and evacuate the fluid motor, this by virtue of the vacuum existing in the manifold at closed throttle. The piston 20 is thus moved to the left and the clutch released, preparatory to gear shifting or to free wheel the vehicle, whenever the throttle is closed and is likewise engaged, as the accelerator pedal is depressed to accelerate the engine, by virtue of the expansion of valve spring 34 to register ports 38 and 40, to vent the motor. The valve 26 forms no part of the present invention, inasmuch as the same constitutes the subject matter of application No. 568,081, filed October 10, 1931.

The aforementioned construction, briefly described, is, in a general way, similar to that of the patent to Belcia 1,470,272, dated October 9, 1923, the present invention constituting an improvement thereover.

Figure 2:
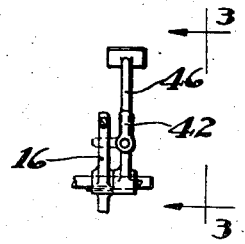
Figure 2 is a view, looking in the direction of the arrows 2—2 of Figure 1 disclosing in detail one form of clutch and brake pedal.

One important feature of the present invention relates to means for operating the clutch in the event of the failure of the aforementioned vacuum operated power mechanism, and to this end there is suggested the provision of a stop 42, Figure 2, adjustably mounted by spring pressed set screw 44, on the brake pedal 46. Should the clutch power device fail for any reason, the operator merely raises the usual bonnet, not shown, in the floor board and drops the stop 42 into the position shown in dotted lines in Figure 2 in contact with or adapted to contact the clutch operating crank arm 16 as the brake pedal is operated. The clutch is thus manually released through the intermediary of the brake pedal as the brake is applied and usually before the brakes are actually applied, this by virtue of the slack take up in the brake hook up.

Figure 5:
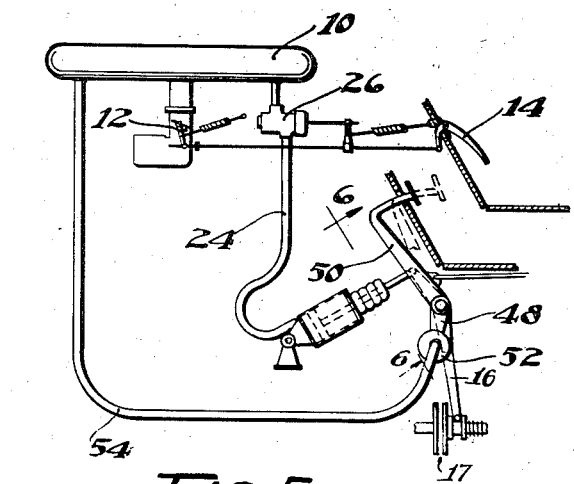
Figure 5 is a view, similar to Figure 1, disclosing a modified form of brake and clutch pedal interconnection.
Figure 6:
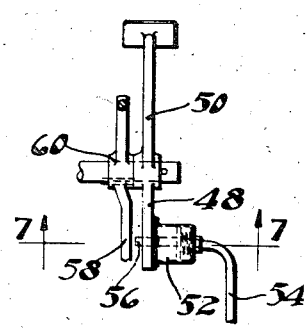
Figure 6 is an enlarged view of the clutch and brake pedal construction of Figure 5 looking in the direction of the arrows 6—6.

There is disclosed in Figures 5, 6, and 7 a power operated stop mechanism provided for the same purpose as that of the stop just described. In this construction there is permanently mounted, on a projection 48 extending from the brake pedal 50, a cylinder 52 housing a piston member 53. The cylinder 52 is in air transmitting connection with the manifold 10 by means of conduit 54.

The clutch is normally controlled by the aforementioned power device, Figure 1, and the evacuated condition of the manifold also serves to evacuate the cylinder 52 to withdraw the piston 53 with its plunger or stop 56 to the right, Figure 7, and out of contact with the lower arm 58 of the clutch crank 60. However, should the vacuum fail for any reason, the plunger 56 is spring pressed to the left, Figure 7, by spring 62 to contact or be contacted by the clutch crank arm 58. Subsequent manual operation of the brake pedal 50 accordingly serves to disengage the clutch in the manner previously described.

In Figures 8, 9, and 10 there is disclosed a mechanism whereby operation of the brake pedal also serves to operate the clutch. In this construction the structure is identical with that of Figure 1 with the exception of the additional mechanism to be now described. To the power operated clutch device of Figure 1 there is added the by-pass conduit 64 connected at its ends to the conduit 24 by a T connection 66 and by a three-way gate or piston valve 68. A similar valve 70 is interposed in the conduit 64, as clearly disclosed in Figures 8 and 9. Bell cranks 72 and 74 are mounted on the cylinder casings of the valves 68 and 70, respectively, the upper arms of the cranks being interconnected with links 76 and 78 connected to the brake pedal.

A governor valve 80, disclosed in detail in Figure 10, is also interposed in the collateral air circuit provided by the conduit 64. This valve preferably comprises a double-ended casing 82 and a spring pressed plunger 84. The left compartment 86 of the valve is placed in circuit via conduit 88 with an oil pump, not shown, driven by the drive shaft of the vehicle, the oil under pressure from the pump serving to maintain the piston 84 in the vacuum cut off position disclosed in Figure 10 with the drive shaft rotating above a predetermined minimum speed. In all conventional automotive vehicles the speed of the vehicle is directly proportional to the speed of the drive shaft; therefore, the governor valve 80 is operative in accordance with the vehicle speed.

In operation of the mechanism of Figure 8 the driver, to decelerate the vehicle, normally first removes his foot from the accelerator pedal 14.

This serves to close the throttle and disengage the clutch as previously described. The brake is now applied, the piston 90 of valve 68 first closing the vacuum connection and then venting the valve to atmosphere via conduit 64 and the valve 70. The clutch is thus engaged to enable the braking effect of the engine to supplement the wheel brakes in decelerating the vehicle. As the brake pedal is further depressed and the vehicle speed proportionately decreased, the lost motion at 92 is taken up and the valve 70 operated to place the governor valve in circuit with the motor cylinder 22. When the speed of the vehicle is decreased to a predetermined degree, the fluid pressure in chamber 86 is reduced and the governor piston is moved to the left by spring 94 to thus again place the cylinder 22 in circuit with the manifold and disengage the clutch.

The clutch is thus engaged for a definite period of time to enable the engine to aid the wheel brakes in decelerating the vehicle, stalling of the motor at low vehicular speed being obviated by the governor mechanism. The relative timing of the aforementioned clutch throttle and brake operations may be varied at will by changing the length of arms of the bell cranks, the throw of the valve pistons, the timing of the governor and in general by changing any one of or a plurality of the many variables involved in the mechanism.

There is thus provided, in an automotive vehicle of conventional structure, means, operable by the brake pedal, for operating the clutch as the brake is applied and collateral governor means for predetermining the degree of such clutch operation.

If desired, the governor valve may be electrically operated as disclosed in Figure 11, a solenoid 80 being energized or deenergized to actuate the piston 84, depending upon the R. P. M. of the drive shaft. As shown, energization of the solenoid core 83 will move the valve to the right, connecting the pipe 64 to manifold suction. A suitable governor 85 driven from the engine shaft may be adjusted to close the circuit through contact 87 and battery 89 when the speed of the engine approximates starting speed. While the engine rotates at higher speeds the solenoid is deenergized and the spring 94 urges the valve to the left disconnecting the suction line 64.

Although this inventon has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a throttle, clutch and brakes, separate manually operated means for operating the throttle and brakes and power operated means for operating the clutch, said throttle and clutch operating means provided with a common element operative to control the operation of both throttle and clutch and means, operable by said brake operating means, comprising a plurality of valves for insuring a successive engagement and disengagement of the clutch as the brake is applied.

2. In an automotive vehicle provided with a throttle, clutch and brakes, separate manually operated means for operating the throttle and brakes and power operated means for operating the clutch, said throttle and clutch operating means provided with a common element operative to control the operation of both throttle and clutch and means, operable by said brake operating means, comprising a plurality of successively operated valves, for insuring a momentary engagement of the clutch as the brake is being applied.

3. In an automotive vehicle provided with a throttle, clutch and brakes, separate manually operated means for operating the throttle and brakes and power operated means for operating the clutch, said throttle and clutch operating means provided with a common element operative to control the operation of both throttle and clutch and means operable by said brake operating means, comprising a plurality of successively operated valves, for insuring a momentary engagement of the clutch as the brake is being applied, one of said valves functioning as a governor to predetermine the time period of said clutch engagement.

4. In an automotive vehicle provided with a throttle, drive shaft, clutch and brakes, separate manually operated means for operating the throttle and brakes and power operated means for operating the clutch, said throttle and clutch operating means provided with a common element operative to control the operation of both throttle and clutch and means operable by said brake operating means, comprising a plurality of successively operated valves, for insuring a momentary engagement of the clutch as the brake is being applied, one of said valves functioning as a governor to predetermine the time length of said clutch engagement, said governor valve comprising means, operative at the predetermined drive shaft speed, to open the valve and permit engagement of the clutch.

5. In an automotive vehicle provided with a drive shaft, brakes and a clutch, manually operated means for applying the brakes and power operated means for operating the clutch and means comprising a power operated governor valve and a plurality of valves operable by said manually operated means, said third mentioned means being operable, as the brake is applied, to momentarily engage the clutch to provide engine braking as an aid to the vehicle brakes and then automatically disengage the clutch when and if the drive shaft speed is reduced to or below a predetermined factor.

6. In an automotive vehicle provided with a drive shaft, brakes and a clutch, manually operated means for applying the brakes and power operated means for operating the clutch and means comprising an electrically operated governor valve and a plurality of valves operable successively by said manually operated means, said third mentioned means being operable, as the brake is applied, to momentarily engage the clutch to provide engine braking as an aid to the vehicle brakes and then automatically disengage the clutch when and if the speed of the drive shaft is reduced to or below a predetermined factor.

7. In an automotive vehicle provided with a drive shaft, a throttle, wheel brakes and a clutch, power operated means for automatically releasing the clutch when the throttle is closed, means operable as the wheel brakes are applied for re-engaging the clutch to supplement the wheel brakes by the engine, the latter acting as a brake, and governor means adapted to effect a second disengagement of the clutch at or below a predetermined drive shaft speed to thereby obviate the stalling of the engine.

8. In a control mechanism for an automotive vehicle provided with a clutch and a brake, means for operating the brake, power means for operating the clutch, said power means including a control valve, control means including a plurality of three-way valves for rendering said clutch operating means alternately inoperative and operative, and connections interconnecting said brake operating means and control means for rendering the clutch operating power means inoperative with actuation of the brake operating means.

9. In a control mechanism for an automotive vehicle provided with a clutch and a brake, means for operating the brake, vacuum operated power means for operating said clutch, said power means including a three-way control valve, a plurality of three-way cutout valves for controlling the operation of said clutch operating means, and connections interconnecting said brake operating means and three-way valves for rendering the clutch operating power means inoperative with actuation of the brake operating means.

10. In an automotive vehicle provided with a clutch and a brake, means for operating the brake and power means for operating the clutch, and means, operable by the brake operating means, for successively cutting out and cutting in the operation of the power means with a brake applying operation of the brake operating means.

11. In an automotive vehicle provided with a clutch and a brake, means for operating the brake and power means for operating the clutch, and means, operable by the brake operating means, for successively cutting out and cutting in the operation of the power means with operation of the brake operating means, said last mentioned means comprising a plurality of successively operated valve members.

12. In an automotive vehicle provided with a clutch and a brake, power means for operating the clutch, and means, operable with operation of the brake, to effect a momentary engagement of the clutch by the cutting out of said power means, said second mentioned means comprising a plurality of successively operated valve members, one of said valve members functioning as a governor to predetermine the length of time of said clutch engagement.

13. In an automotive vehicle provided with a clutch and a brake, power means for operating the clutch, and means, operable with operation of the brake, to effect a momentary engagement of the clutch by the cutting out of said power means, said second mentioned means comprising a plurality of successively operated valve members, one of said valve members functioning as a governor to predetermine the length of time of said clutch engagement, and another of said valves functioning as a cut-in valve to again energize said power means to disengage the clutch after the operation of said governor valve.

14. In an automotive vehicle provided with a drive shaft, a clutch and a brake, manually operable means for operating the brake and power means for operating the clutch, said latter means comprising a power actuator operably connected to the clutch and further comprising a fluid transmitting connection interconnecting a source of power and said power actuator, a control valve for said actuator interposed in said fluid transmitting connection, a cut-out valve member also interposed in said fluid transmitting connection between said aforementioned control valve and the power actuator, a by-pass fluid transmitting connection interconnecting said cut-out valve with said first mentioned fluid transmitting connection, said by-pass having incorporated therein a cut-in valve member, and means, operable by the brake operating manually operable means, for rendering operable said cut-out and cut-in valves, said by-pass further including a governor means for rendering said cut-in valve operable at or below a predetermined drive shaft speed whereby the clutch is successively disengaged, engaged and again disengaged with operation of said first mentioned control valve and with subsequent operation of said manually operable brake operating means.

15. In a clutch control for an automobile, the combination with an auxiliary motor for releasing the engine clutch, and means to render said motor inoperative when the brake pedal of said automobile is depressed through a portion of its total travel, said means being adapted to release said motor again when said brake pedal is fully depressed.

ROY S. SANFORD.